United States Patent [19]

Harlan, Jr. et al.

[11] 3,992,339

[45] Nov. 16, 1976

[54] PRIMERS FOR USE BETWEEN METAL SUBSTRATES AND BLOCK COPOLYMERS

[75] Inventors: James T. Harlan, Jr.; David J. St. Clair, both of Torrance, Calif.

[73] Assignee: Shell Oil Company, Houston, Tex.

[22] Filed: May 15, 1975

[21] Appl. No.: 577,579

[52] U.S. Cl. .................. 260/27 BB; 260/32.8 A; 260/33.6 A
[51] Int. Cl.² .................. C08K 5/01; C08K 5/07; C08L 93/00
[58] Field of Search ...... 260/27 BB, 32.8 A, 33.6 A, 260/448.8 R, 880 B, 829, 876 B, 846

[56] References Cited
UNITED STATES PATENTS

| | | | |
|---|---|---|---|
| 3,239,478 | 3/1966 | Harlan | 260/27 BB |
| 3,350,345 | 10/1967 | Vanderbilt et al. | 260/42.15 |
| 3,665,027 | 5/1972 | Reichel | 260/448.8 R |
| 3,674,542 | 7/1972 | Vanderbilt et al. | 260/42.15 |
| 3,768,537 | 10/1973 | Hess et al. | 260/448.8 R |

OTHER PUBLICATIONS

Sterman et al.—Adhesives Age, 8, July 1965, pp. 34–39.

*Primary Examiner*—Donald E. Czaja
*Assistant Examiner*—H. H. Fletcher

[57] ABSTRACT

A primer for block copolymer based sealants comprises a solution of the block copolymer, an adhesion promoting resin compatible in the higher softening point block of the block copolymer, a silane and oxidation/UV stabilizers. A process for applying a block copolymer based sealant comprises coating a substrate with a thin layer of a solution of block copolymer, an adhesion promoting resin associating with the block having the highest softening point, a silane and oxidation/UV stabilizers in a solvent, evaporating the solvent and applying a layer of block copolymer sealant over the residue left after evaporating the solvent.

4 Claims, No Drawings

PRIMERS FOR USE BETWEEN METAL SUBSTRATES AND BLOCK COPOLYMERS

BACKGROUND OF THE INVENTION

Block copolymers are considered attractive components for the production of sealants and coatings. Block copolymers wherein there are at least two poly(monoalkenyl arene) blocks and at least one elastomeric poly(conjugated diene) block or the hydrogenated or partially hydrogenated product of the above block copolymer have a combination of properties that make them especially attractive as components of coating and sealants. These rubbers and rubber like polymers may be formulated into coatings and sealants which retain their tensile, hardness and flexibility and thus resist cracking and peeling because of the absence of the need for extensive chemical crosslinking. While the block copolymer compositions exhibit attractive long term tensile, hardness and flexibility properties, they are considered unsatisfactory as sealants and coatings for some purposes because peel strength (the strength of the bond between the substrate and the coatng or sealant) when applied by practical application methods is unacceptable. This invention is a primer and a method of applying the primer and sealant or coating that overcomes the poor peel strength which is exhibited by conventionally applied block copolymer sealants and coatings.

SUMMARY OF THE INVENTION

The invention relates to a primer for the promotion of adhesion between a substrate and sealant or coating based on a poly(alpha-monoalkenyl arene)/poly(conjugated diene) block copolymer or hydrogenated or partially hydrogenated derivatives thereof which comprises about 25 percent to about 90 percent by weight of a solvent having a solubility parameter in the range of about 7.5 to about 9.5 and a boiling point between about 70° C and about 150° C, about 1 to about 20 percent by weight of the block copolymer used in the sealant or coating, about 5 to about 50 percent by weight of an adhesion promoting resin which associated with the poly(alpha-monoalkenyl arene) block of the block copolymer, about 0.01 to about 5 percent by weight of a silane, and about 0.01 to about 2 percent by weight of an oxidation/UV stabilizer. The invention also relates to a process of applying a poly(alpha-monoalkenyl arene)/elastomeric poly(conjugated diene) block copolymer sealant or coating which comprises applying a thin layer of the above described primer, evaporating the solvent, and applying the block copolymer sealant or coating over the residue of the primer on the substrate after evaporation of the solvent.

DESCRIPTION OF THE PREFERED EMBODIMENTS

The Sealant or coating:

The sealants or coatings of this invention are those made from block copolymers having at least two poly(alpha-monoalkenyl arene) blocks and at least one elastomeric poly(conjugated diene) block or the hydrogenated or partially hydrogenated derivatives thereof. The number of blocks of each type is not especially important and the molecular configuration of the blocks can be either linear, radial, or comb type depending on how the block copolymer is formed. The preferred block copolymers are those containing two poly(alpha-monoalkenyl arene) blocks and one elastomeric poly(conjugated diene) block or the completely hydrogenated or randomly or selectively partially hydrogenated derivatives thereof. Of these various types of block copolymers, the linear ABA type is preferred.

The preferred alkenyl aromatic monomers are the styrenic types such as styrene, alphamethylstyrene and the ring alkane substituted styrenes. The preferred conjugated dinene monomers are butadiene and isoprene.

The prefered block copolymers are the linear ABA blockcopolymers of polystyrene-polybutadiene-polystyrene, polystyrene-hydrogenated polybutadiene-polystryene, polystyrene-polyisoprene-polystyrene and polystyrene-hyrogenated polyisoprene-polystyrene. Of the above preferred ABA linear block copolymers, the most preferred type is the polystyrene-polybutadiene-polystyrene block copolymer in which substantially all of the aliphatic double bonds of the polybutadiene block have been saturated (hydrogenated) and substantially none of the aromatic unsaturation of the polystyrene block has been saturated (hydrogenated).

The segmental molecular weights of the most preferred polystyrenehyrogenated polybutadiene-polystyrene block copolymer (hereinafter referred to as S-EB-S) are those in which the polystyrene blocks have average molecular weights between about 4,000 and about 50,000, while the elastomeric center blocks have an average molecular weight of between 18,000 and about 250,000.

The number average molecular weights referred to in the specification and claims are those preferably obtained as follows: The molecular weight of the first block polymerized was measured by gel permeation chromatography (GPC) on a terminated sample removed immediately after its polymerization. The chromatograph was calibrated using commercially available polystyrene molecular weight standards, prepared and tested by Mellon Institute procedures. The molecular weights of the second and third blocks polymerized were determined by measuring the polystyrene content of terminated samples removed immediately after polymerization of the second and third blocks, respectively. The molecular weights of the second and third blocks are based on the assumption that all of the polymerized monomer uniformly added to the active polymer chain ends. The thermoplastic monovinyl arene block should constitute between about 8 percent and about 55 percent by weight of the block copolymer, preferably between about 10 percent and about 30 percent by weight. The percentage of 1, 2 addition content of the polybutadiene segment which is selectively hydrogenated is between about 20 percent and about 80 percent, and most preferably between about 35 percent and about 50 percent. At least 95 percent, preferably at least 99 percent of the double bonds of the polybutadiene block are hydrogenated, while less than 10 percent, preferably less than 2 percent of the aromatic double bonds of the polystyrene block are hydrogenated.

A preferred sealant composition is as follows; 3 to 30 percent by weight S-EB-S block copolymer, 10-70 percent by weight of a paraffinic/naphthenic oil, 0 to 50 percent by weight of an adhesion promoting resin having a solubility parameter ranging from about 8 to about 10, 10 to 70 percent by weight or an inorganic filler and about 0.01 to about 2.0 percent by weight of oxidation/UV stabilizers.

The sealants of this invention are those containing about 3 to about 30 percent by weight of the block copolymer, preferably about 5 to about 20 percent by weight and most preferably about 10 or about 20 percent by weight.

The paraffinic/naphthenic oils used in the sealants of this invention are those having a solubility parameter ranging from about 7 to about 8, preferably from about 7.3 to about 7.8. These oils are those having a viscosity at 100° F in the range of about 20 to about 170,000 centistokes, preferably from about 3,000 to about 30,000 centistokes. Preferred oils are highly refined aromatic-free hydrocarbon oils or polyolefin oligomers. The most preferred oils are the polybutene oligomers. A sealant of this invention contains about 10 to about 70 percent by weight of the oil, preferably from about 20 to about 50 percent by weight and most preferably from about 30 to about 40 percent.

The adhesion promoting resins used in the sealants of this invention are those having a solubility parameter from about 8 to about 12, preferably from about 8.5 to abot 10. These resins are selectively associated with the polystyrene block of the block copolymers. The adhesion promoting resin contents are in the range of about 0 to about 50 percent, preferably from about 1 to about 40 percent by weight, most preferably from about 15 to about 30 percent. Preferred adhesion promoting resins are, coumarone-indene resins such as Nevchem 140 from Neville Chemical Company; thermoplastic polar hydrocarbon-rosin ester resins such as Pexalyn A and Ar-500, 550, 560, 600, 800, 900, 950, 960, from Hercules, Inc.; terpene phenolic resins such as Picco LTP-135, ex Hercules Inc.; alpha-methylstyrene/vinyl toluene copolymers such as Piccotex 75 and 120, ex Hercules Inc.; poly-alpha-methylstyrene resins such as Amoco 18-290 ex Amoco Chemical Corp.; polystyrene resins such as Polystyrene 303 TPR, ex Shell Chemical Company. The preferred adhesion promoting resins are the thermoplastic polar hydrocarbon-rosin ester resins. While the resins which associate with the end block are preferred, adhesion promoting resins which associate predominately with the mid-block may be used in the sealant.

The sealant composition contains about 10 to about 70, preferably about 20 to about 50 and most preferably about 30 to about 40 percent by weight of an inorganic filler. Preferred inorganic fillers are $CaCO_3$, $TiO_2$, ZnO, clay and talc or mixtures thereof. The most preferred are $CACO_3$, $TiO_2$ and ZnO or mixtures thereof.

The stabilizer or combination of stabilizers which are used in the sealants of this invention are those known in the art which protect the block copolymer oil and adhesion promotion resin from UV radiation and oxidative degradation. These stabilizers are used at a level of about 0.01 to about 2.0 percent by weight, preferably from about 0.1 to about 0.4 percent by weight. Prefered stabilizers are Irganox 1010 (Tetrakis-[methylene-(3,5-di-tertiary-butyl-4-hydroxy-hydrocinnamate)]- methane, Ciba-Geigy Company), Epon 1002 resin (epoxy resin ex Shell Chemical Company), Cyasorb 1084 (2,2' Thio-bis-(4-tertiary octylphenolato) -n-butylamine nickel(II), American Cyanamide Company), Ethyl 330 (1,3,5-Trimethyl-2,3,6-Tris-(3',5'-di-tertiary butyl-4'-hydroxybenzyl)benzene, Ethyl Corp.) and Tinuvin 327 2-(2'-hydroxy-3',5'-di-tertiary butyl phenol)-7-chlorobenzotraizole, Ciba Geigy Co.) or mixtures thereof. Most preferred stabilizers are Irganox 1010, Epon 1002, and Cyasorb 1084 or mixtures thereof.

A preferred sealant composition is:

| Component | | Percent by weight |
|---|---|---|
| Block copolymer S-EB-S Segmental Molecular Weights in thousands (7.5-37.5-7.5) | | 11.93 |
| Plasticizing oil, Indopol H-300 (a polybutene oligomer) | | 34.07 |
| Adhesion promoting resin, Pexalyn A-960 | | 17.90 |
| Filler | $CaCO_3$ | 21.48 |
| | $TiO_2$ | 7.16 |
| | ZnO | 7.16 |
| Stabilizer, | Irganox 1010 | 0.05 |
| | Epon 1002 | 0.23 |
| | Cyasorb 1084 | 0.02 |

The Primer

While the above described sealants have excellent physical properties, they may show inadequate adhesion to a substrate when applied in the typical methods, i.e., via a hot melt sealant applicator such as a Hardman Gun or when the sealant is masticated with a small amount of solvent and applied. One way of obtaining adequate adhesion is to use the primer of this invention. The primers have a composition as follows:

| Component | Percent by weight |
|---|---|
| Block copolymer | 1-15 |
| Adhesion promoting resin | 5-50 |
| Silane | 0.01-5 |
| Stabilizer | 0.01-2.0 |
| Solvent | 27-94 |

The block copolymers used in the primer are the same type as used above in the sealant. Best results are obtained when the block copolymer used in the primer is identical to the block copolymer used in the sealant, but acceptable results are obtained when there is compatibility between only one of the blocks of the two block copolymers used in the sealant and the primer.

The block copolymer is used at a level from about 1 to about 15 percent by weight based on the total weight of the ingredients, preferably from abot 2.5 to about 10 percent by weight and most preferably from abot 5 to about 10 percent by weight.

The primer must also contain from about 5 to about 50 percent based on the total weight of the primer of an adhesion promoting resin, preferably from about 10 to about 30 and most preferably from about 15 to about 25 percent by weight. The adhesion promoting resin must associate primarily with the end block of the block copolymers. The prefered adhesion promoting resins are those having a solubility parameter of from about 8 to about 10, preferably from about 8.5 to about 9.5 and most preferably from about 8.9 to about 9.3. Preferred adhesion promoting resins are the polyindenes containing small amount of coumarone (Nevchem 140), terpene phenolics (Picco LTP-135), alphamethylstyrene/vinyl toluene copolymer (Piccotex 75), poly(alphamethyl-styrene) (Amoco 18-210), and polar hydrocarbon-rosin ester modified resin (Pexalyn A-960). The most preferred adhesion promoting resins are terpene phenolic resins (Picco LTP-135).

In addition to the adhesion promoting resin the primer contains a component to protect the adhesive bonds from the detrimental effects of water. This component is a silane which is used in amounts ranging from about 0.01 to about 5 percent by weight based on total weight of the primer. Preferred amounts range from about 0.05 to about 2, most preferred amounts range from about 0.05 to about 0.5. The preferred silane types are polyaminofunctional silanes, mercaptofunctional silanes or cationic styryl silanes. The most preferred silanes are $(CH_3O)_3Si(CH_2)_3NHCH_2CH_2NH_2$, $(CH_3O)_3Si(CH_2)_3SH$, $C_6H_5Si(OCH_3)_3$, and $H_2NCH_2CH_2NHCH_2CH_2Si(OCH_3)_3$.

The primer also contains oxidation stabilizers to protect it. These stabilizers ae used in the range of about 0.01 to about 2 percent by weight based on the total weight of the primer, preferably in the range of about 0.05 to about 0.2. The preferred stabilizers are the hindered phenols such as Ethyl 330, the benzotriazoles such as Tinuvin 324 and the nickel chelates such as Cyasorb 1084.

To effect a strong bond with the substrate it is necessary to have a solvent as part of the primer. This solvent must be capable of dissolving all of the other ingredients of the primer and must be readily evaporated from the surface of the substrate. Preferred solvents are those having a solubility parameter in the range of about 7.5 to about 9.5, preferably about 8.0 to about 9.0. The boiling point of the solvent should be in the range of about 70° C to about 150° C, preferably about 100° C to about 140° C. Preferred solvents are xylene, toluene, cyclohexane, methyl ethyl ketone or mixtues thereof. The solvent should compose about 94 to about 27 percent by weight of the total weight of the primer, preferably about 90 to about 50 percent and most preferably about 80 to about 60 percent.

Method of Applying the Block Copolymer Sealant

There are two general methods of applying sealants. The solvent-free sealant is applied in hot form in order to achieve the needed flow characteristics or a small amount of solvent is added to the sealant, preferably from about 5 to about 20 percent by weight based on total sealant, most preferably from about 10 to about 15 percent by weight, in order to achieve the needed flow characteristics. Either one of these two methods may be used with the block copolymer sealants of this invention. The preferred solvents for preparing a mastic are those that primarily dissolve the high softening point block of the block copolymer, i.e., solvents having a solubility parameter of from about 8 to 11, preferably from about 8 to about 10.

The substrate on which the sealant system is to be applied can be any solid substance but is usually either metal, glass, wood, concrete, masonry or plastic. The primer is applied to the surface of the substrate by any method suitable for distributing it over the desired surface area. It may be painted, sprayed, rolled or wiped on or the substrate may be dipped into the primer. The coated substrate is allowed to stand until a major portion of the solvent has evaporated then the sealant is applied to the surface of the substrate covered by the primer either as a hot melt or as a plasticated mastic.

Method of making the Sealant and Primer

The sealant may be prepared by mixing the ingredients disclosed above in any high shear mixing device such as a sigma blade, Banbury, or Henschel mixer or an extruder.

The primer is formed by combining all of the ingredients in any sequence and stirring until a homogeneous solution is formed.

The following Illustrative Embodiments are given to illustrate the invention and should not be interpreted to limit the scope of the invention.

Illustrative Embodiment I

The block copolymer sealant was prepared by blending the following ingredients in a Baker Perkins Sigma Blade Mixer at 125° C.

| Component | Phr | Percent by Weight |
|---|---|---|
| S-EB-S (7.5M-37.5M-7.5M)[1] | 100 | 11.93 |
| Indopol H-300 | 285 | 34.07 |
| Pexalyn A-960 | 150 | 17.90 |
| $CaCO_3$ | 180 | 21.48 |
| $TiO_2$ | 60 | 7.16 |
| ZnO | 60 | 7.16 |
| Irganox 1010 | 0.5 | 0.05 |
| Epon 1002 | 2 | 0.23 |
| Cyasorb 1084 | 0.2 | 0.02 |

[1] Molecular weight of blocks

The resultant sealant had the following properties:

| Test | |
|---|---|
| Hardness, Shore A, Instantaneous[1] | 18 |
| Tensile Properties[2] | |
| Modulus at 100% Elongation, psi | 40 |
| Ultimate Tensile Strength, psi | 320 |
| Elongation at Break, percent | 570 |

[1] Measured at 23° C using a Shore A durometer
[2] Measured at 23° C on 1/16 inch thick dumbbell-shaped samples cut using a "D" die described in ASTM D412. Tested according to ASTM D412 except for the crosshead speed which was 10 inches per minute.

The primer for the above sealant was prepared by combining the following ingredients in a stirred reactor and stirring until a homogenous solution was formed.

| Component | Example | Percent wt. |
|---|---|---|
| Adhesion Promoting Resin | Picco LTP-135 | 25 |
| Water Resistance component | $(CH_3O)_3Si(CH_2)_3NHCH_2CH_2NH_2$ | 0.12 |
| Rubber block copolymer | S-EB-S(7.5M-37.5M-7.5M) | 10 |
| Stabilizers | Irganox 1010 | 0.1 |
| | Cyasorb 1084 | 0.05 |
| Solvent | Xylene | Remainder |

The following data obtained in the laboratory demonstrate the remarkable effectiveness of the example primer formulation in improving the strength of the sealant-to-primer-to-substrate bond. The 180° peel strengths of three sealants on both Aluminum and glass substrates are presented with the same sealant/primer formulation as shown above except using different adhesion promoting resins. Test samples were made with the Hardman hol melt sealant applicator set at 350° F.

| Resin Used in Sealant | | 180 Peel Strength, pli[4] | | | |
|---|---|---|---|---|---|
| | | On Aluminum | | On Glass | |
| | | Unaged | After 7 days in $H_2O$ | Unaged | After 7 days in $H_2O$ |
| Pexalyn A-960[1] | Unprimed | 2[a] | — | 3[a] | — |
| | Primed | 31[c] | 44[c] | 37[a] | 40[c] |
| Picco LTP-135[2] | Unprimed | 3[a] | 0[a] | 3[a] | 1[a] |
| | Primed | 52[c] | 66[c] | 46[c] | 58[c] |
| Nevchem 100[3] | Unprimed | 1[a] | — | 1[a] | — |
| | Primed | 14[a] | 31[c] | 28[c] | 38[c] |

[1]Thermoplastic polar hydrocarbon-rosin ester modified resin, Hercules
[2]Terpene-phenolic resin, Hercules Inc.
[3]Coumarone-indene resin, Neville Chemical
[4]Test measured according to Federal Specification TTS-00230C, Section 4.3.10
[a]100 percent adhesive failure.
[c]Partial to complete cohesive failure of sealant.

We claim as our invention:

1. A primer to be applied to metal substrates for a sealant containing a block copolymer having at least two poly(alpha-monoalkenyl arene) blocks and at least one elastomeric poly(conjugated diene) block or the hydrogenated or partially hydrogenated derivative, thereof, where the primer consists essentially of:
   a. about 1 to about 15 percent by weight of a block copolymer having the structure polystyrene-hydrogenated polybutadiene-polystyrene wherein the polystyrene blocks constitute about 8 percent to about 55 percent by weight of the block copolymer;
   b. about 5 to about 50 percent by weight of an adhesion promotive resin having a solubility parameter in the range of about 8 to about 10;
   c. about 0.01 to about 5 percent by weight of the silane $(CH_3O)_3Si(CH_2)_3SH$;
   d. about 0.01 to about 2 percent by weight of an oxidation stabilizer; and
   e. about 27 to about 94 percent by weight of a solvent having a solubility parameter in the range of about 7.5 to about 9.5 and a boiling point in the range of about 70° C to about 150° C.

2. The primer of claim 1 where B is an adhesive promoting resin selected from the group consisting of coumarone-indenes, terpene phenolics, alphamethylstyrene/vinyl toluene copolymers, poly(alphamethylstyrene), polyhydrocarbon-rosin ester modified resins or mixtures thereof.

3. The primer of claim 2 where D is an oxidation stabilizer selected from the group consisting of hindered phenol, benzotriazole, nickel chelate or mixtures thereof.

4. The primer of claim 3 where E is a solvent selected from the group consisting of xylene, toluene, cyclohexane, methylethylketone or mixtures thereof.

* * * * *